United States Patent [19]

Ishigaki

[11] Patent Number: 4,933,867
[45] Date of Patent: Jun. 12, 1990

[54] PRINTING APPARATUS

[75] Inventor: Toshinori Ishigaki, Oome, Japan

[73] Assignee: Kabushiki Kaisha Toshiba, Kawasaki, Japan

[21] Appl. No.: 328,714

[22] Filed: Mar. 27, 1989

Related U.S. Application Data

[63] Continuation of Ser. No. 38,416, Apr. 13, 1987, abandoned, which is a continuation of Ser. No. 615,279, May 30, 1984, abandoned.

[30] Foreign Application Priority Data

| | | | |
|---|---|---|---|
| Jun. 24, 1983 | [JP] | Japan | 58-112861 |
| Jun. 29, 1983 | [JP] | Japan | 58-115983 |
| Jun. 29, 1983 | [JP] | Japan | 58-115982 |
| May 31, 1985 | [JP] | Japan | 58-94815 |

[51] Int. Cl.[5] .................. G06F 15/40; B41J 3/02; B41J 19/68
[52] U.S. Cl. .................. 364/519; 400/120; 400/121; 400/313
[58] Field of Search .................. 364/518, 519, 708; 400/88, 120, 121, 313, 314, 314.1, 322, 328, 569

[56] References Cited

U.S. PATENT DOCUMENTS

| | | | |
|---|---|---|---|
| 3,973,111 | 8/1976 | Washizuka et al. | 400/88 |
| 4,147,967 | 4/1979 | Aiena | 364/519 |
| 4,412,232 | 4/1982 | Weber et al. | 400/88 |
| 4,427,314 | 1/1984 | Fujiwara et al. | 400/120 |
| 4,433,925 | 2/1984 | Fukiwara | 400/314 X |
| 4,436,439 | 3/1984 | Koto | 400/322 X |
| 4,460,968 | 7/1984 | Cavill et al. | 364/519 |
| 4,469,460 | 9/1984 | Hughes et al. | 400/322 |
| 4,490,796 | 12/1984 | Bigbie et al. | 364/519 |
| 4,506,344 | 3/1985 | Hubbard | 364/708 |
| 4,523,235 | 6/1985 | Rajchman | 400/88 |
| 4,549,825 | 10/1985 | Fish, III et al. | 400/322 X |
| 4,566,813 | 1/1986 | Kobayashi et al. | 400/120 |
| 4,567,570 | 1/1986 | Peer | 364/519 X |
| 4,575,733 | 3/1986 | Hattori et al. | 400/120 X |
| 4,577,932 | 3/1986 | Sasaki | 400/322 X |
| 4,675,692 | 6/1987 | Goshima et al. | 400/121 X |

FOREIGN PATENT DOCUMENTS

| | | | |
|---|---|---|---|
| 191068 | 11/1982 | Japan | 400/88 |
| 0093370 | 5/1984 | Japan | 400/314 |
| 2078616 | 1/1982 | United Kingdom | 400/88 |

OTHER PUBLICATIONS

Parks, D. P. "Velocity Profile Generator", *IBM Technical Disclosure Bulletin*, vol. 22, No. 88, Jan. 1980, pp. 3538–3541.

Klein, U. "Programmed Printer Controller SMP-E355 and -E 356" Seimens Components XV (1980), Jul.). No. 3, pp. 139–143.

Cavill et al, "Printer Data Processing/Word Processing Enhanced Controller System", *IBM Tech. Disc. Bull,.*, vol. 24, No. 118, Apr. 1982, pp. 5885–5887.

*Primary Examiner*—Parshotam S. Lall
*Assistant Examiner*—Joseph L. Dixon
*Attorney, Agent, or Firm*—Cushman, Darby & Cushman

[57] ABSTRACT

A printing apparatus connected to a data processing device includes a printing section having a printing head, a detector for detecting the moving velocity of the printing head and a control circuit integrally incorporated therein. The control circuit serves to control the print driving pulse width and the drive timing of the printing head. If the printing section is manually moved to perform scanning on a paper sheet, the drive timing of the printing head is changed by the control circuit to correspond to the moving velocity of the printing head relative to the paper sheet so as to perform printing based on the printing data supplied from the data processing device. Every time a carriage return code or a line feed code is detected from among the printing data, the printing head is brought back to the print starting position on the left side, and the printing line is shifted by one line.

2 Claims, 18 Drawing Sheets

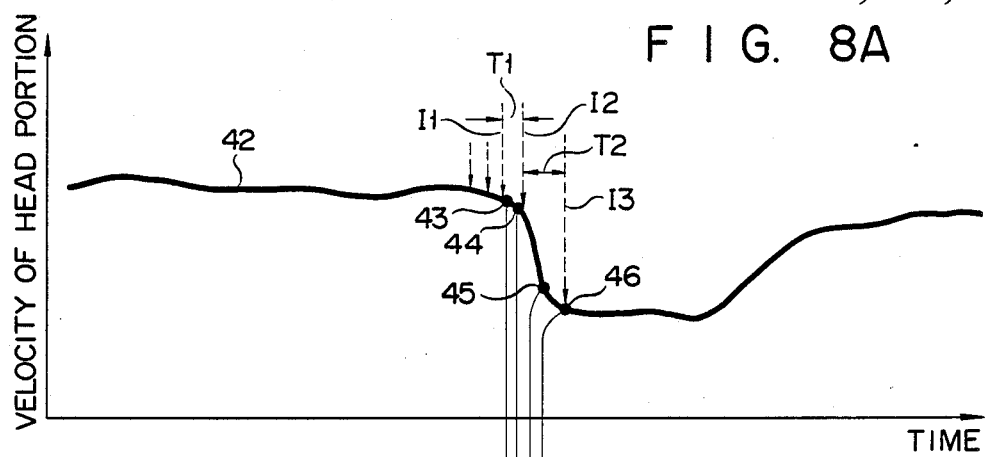
FIG. 8A
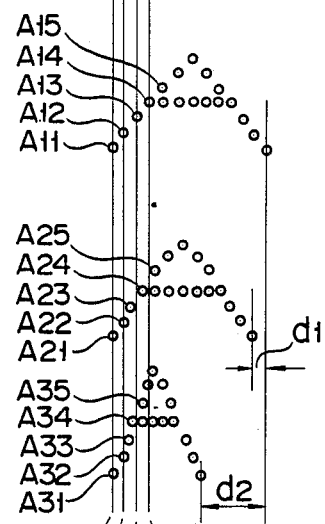
FIG. 8B
FIG. 8C
FIG. 8D
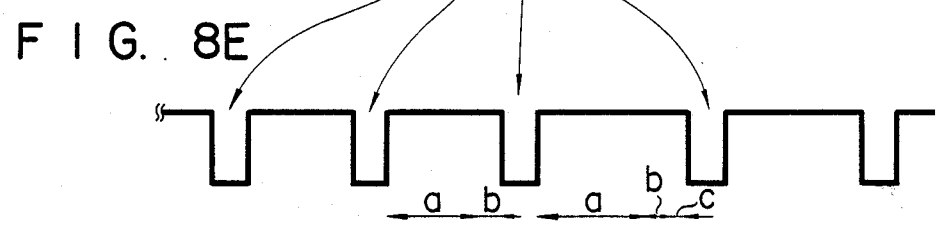
FIG. 8E
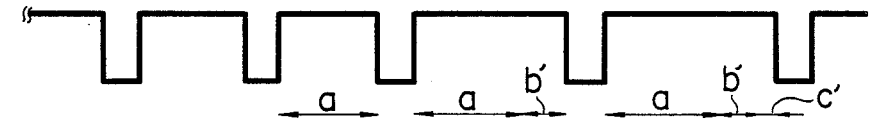
FIG. 8F

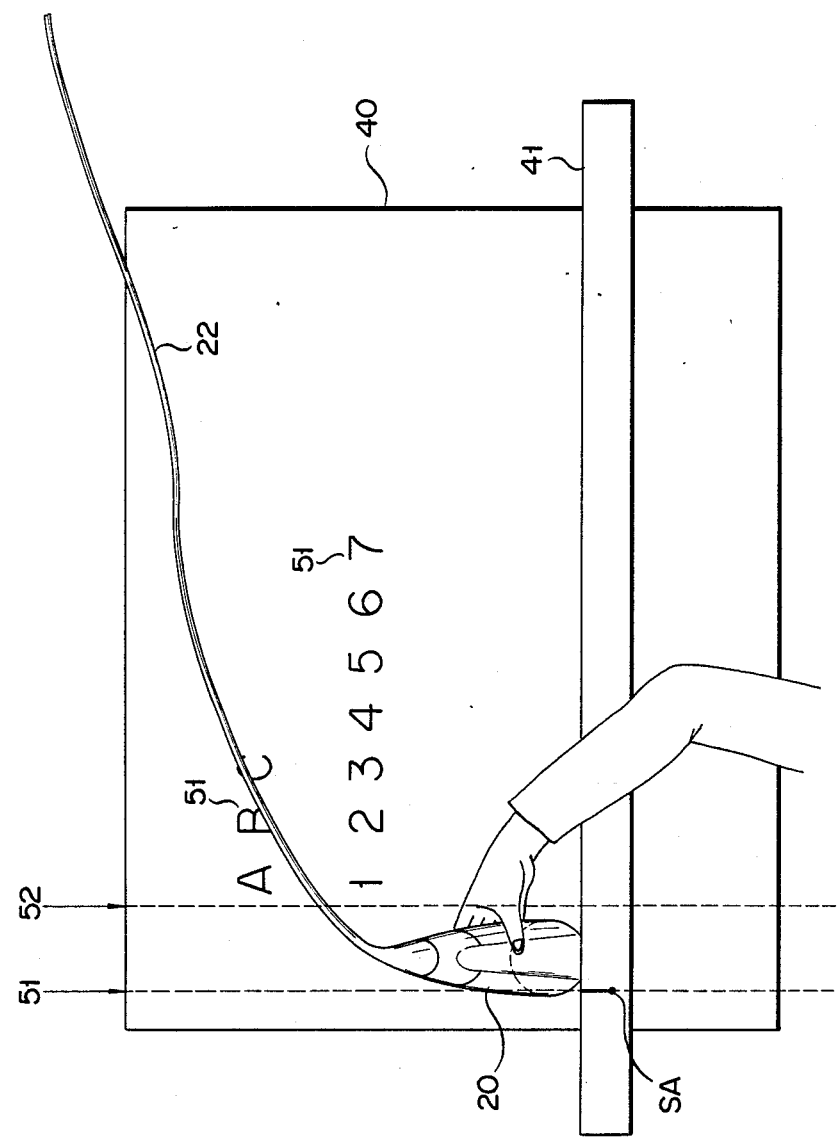

PRINTING APPARATUS

This is a continuation of application Ser. No. 07/038,416, filed Apr. 13, 1987, now abandoned, which was a continuation of Ser. No. 06/615,279 filed May 30, 1984, abandoned.

BACKGROUND OF THE INVENTION

The present invention relates to a printing apparatus and, more particularly, to a printing system having a printing head scanning mechanism suitable for performing printing on a large paper sheet.

FIG. 1 is a perspective view showing a printer mechanism of a conventional printing apparatus. A printing head 1 is disposed in the vicinity of a platen 3 for feeding a paper sheet 2. The printing head 1 is reciprocally supported by a guide bar 4 which is disposed to be parallel to the platen 3. In addition, the printing head 1 is fixed on a head belt 5. The head belt 5 is looped to be parallel to the guide bar 4 and is driven by a head motor 6. A flat cable 8, extending from a control printed circuit board 7, is connected to the printing head 1. The printing head 1 is energized through the cable 8. One end of the platen 3 is connected to a drive stepping motor 10 through a gear mechanism 9.

The printing head 1 performs thermal printing on the paper sheet 2 in response to a control current flowing from the control printed circuit board 7, while the head belt 5 is driven by the head motor 6 and the printing head 1 is fed in the right and left directions along the guide bar 4. Line feed can be performed by driving the platen 3 by means of the stepping motor 10.

In the conventional printing apparatus described above, in order to print on a wide paper sheet, a length W of the printer mechanism along the longitudinal direction thereof must be increased, and the lengths of the respective parts such as the platen 3, the guide bar 4, and the head belt 5 must be increased. At the same time, the capacities of the head motor 6 and the stepping motor 10 must be increased. Therefore, the component parts become more expensive, and the printing apparatus as a whole is enlarged. In addition to these disadvantages, increased power consumption, results in higher costs.

SUMMARY OF THE INVENTION

It is an object of the present invention to provide a compact, low-cost printing apparatus having small component parts to perform printing on a large paper sheet.

According to the present invention, an operator holds a printing section or head portion and scans a paper sheet. The printing section has an IC and the like which constitute a printing head heater, a speed detecting roller, and a control circuit. A microcomputer in the control circuit changes a drive timing of the printing head heater in correspondence with a change in the velocity of the printing section so as to print a character with a correct shape. The horizontal scanning mechanism of the printing head and the line feed mechanism of the paper sheet can be omitted. When such printing is performed on a large paper sheet, the horizontal scanning mechanism and the line feed mechanism need not be enlarged. Only the scanning distance of the printing section is increased, so that the large paper sheet can be printed economically. In addition, since the horizontal scanning mechanism of the printing section and the line feed mechanism of the paper sheet can be omitted, the apparatus requires less power. Furthermore, substantially no noise is generated.

In order to achieve the above object of the present invention, there is provided a printing apparatus, comprising printing head means for performing printing on a paper sheet, printing head driving means for driving said printing head means, velocity detecting means for detecting a velocity of said printing head means, and controlling means for controlling a drive pulse width and a drive timing of said printing head driving means, such that the drive timing of said printing head means changes in correspondence with the velocity of said printing head means when said printing head means is manually moved to perform scanning on the paper sheet, and a signal indicating the velocity of said printing head means is supplied from said velocity detecting means thereto.

BRIEF DESCRIPTION OF THE DRAWINGS

Other objects and features of the present invention will be apparent from the following descriptions taken in conjunction with the accompanying drawings, in which:

FIG. 8A is a graph showing the velocity of the head portion as a function of time, FIG. 8B shows an ideal printing state, FIG. 8C shows a printing state with an error d1, FIG. 8D shows a printing state with an error d2, FIG. 8E is a timing chart of a printing head drive pulse to obtain ideal printing, and FIG. 8F is a timing chart of a printing head drive pulse when an error occurs in printing;

FIG. 10 is a perspective view showing printing procedures wherein the operator performs printing with a printing section or printing head portion, according to another embodiment of the present invention;

DETAILED DESCRIPTION OF THE PREFERRED EMBODIMENTS

Figure 1:
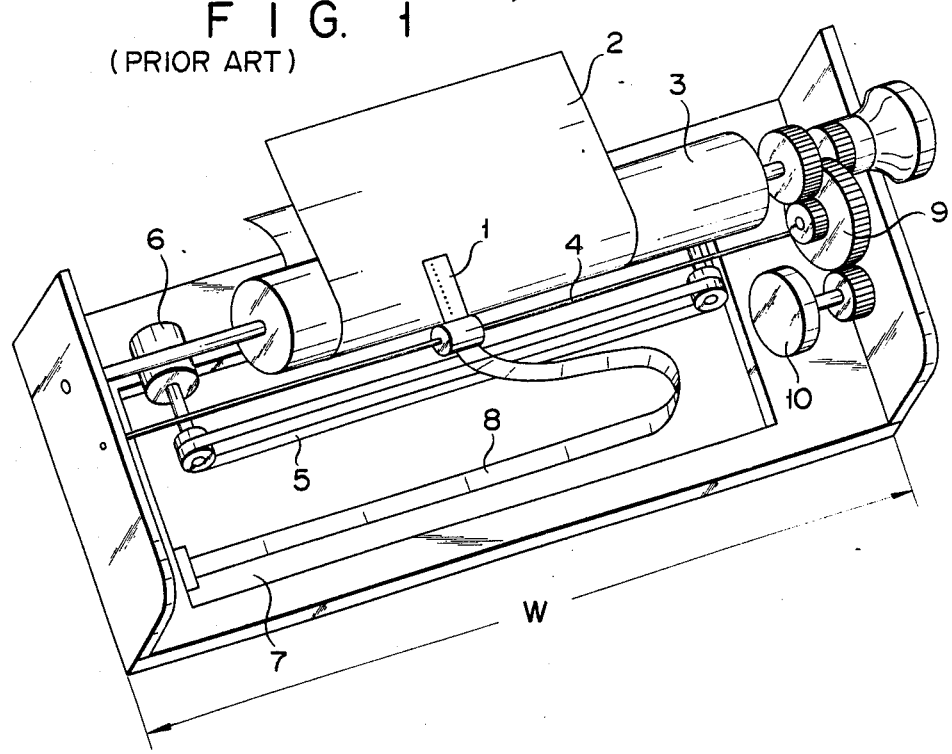
FIG. 1 is a perspective view of a conventional printing apparatus.
Figure 2:
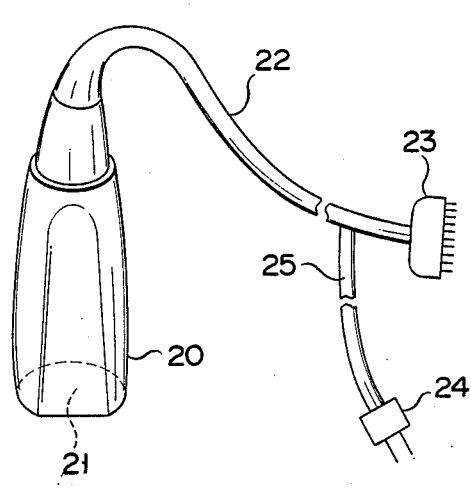
FIG. 2 is a schematic view of a printing section or printing head portion of a printing apparatus, according to an embodiment of the present invention.

Printing, according to preferred embodiments of the present invention, will be described with reference to the accompanying drawings. FIG. 2 is a schematic view of the present invention's printing section, which performs the printing operation. A printing section 20 has a shape which allows it to be easily held by an operator. A printing head (not shown) is arranged at a base 21 of the printing section 20. A cable 22 is connected to the upper portion of the printing section 20 to transmit printing data. A connector 23 is connected to an end of cable 22 which is not coupled to the upper portion of the printing section 20. The connector 23 is coupled to a main unit (not shown). A power cable 25 of an AC adapter 24 for converting a voltage of 100 V AC to a DC voltage is connected to the printing section 20. A DC voltage is applied to the printing section 20 through the power cable 25.

Figure 3:
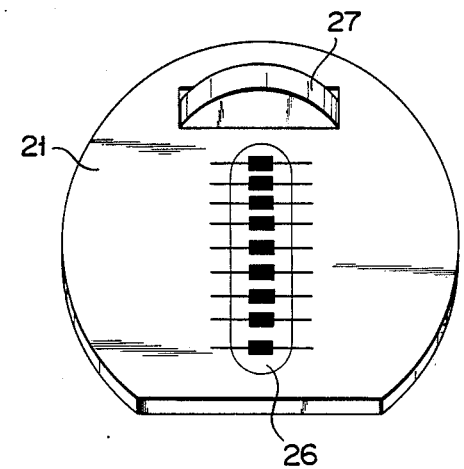
FIG. 3 is an enlarged view of a printing surface of the printing section shown in FIG. 2.
Figure 4:
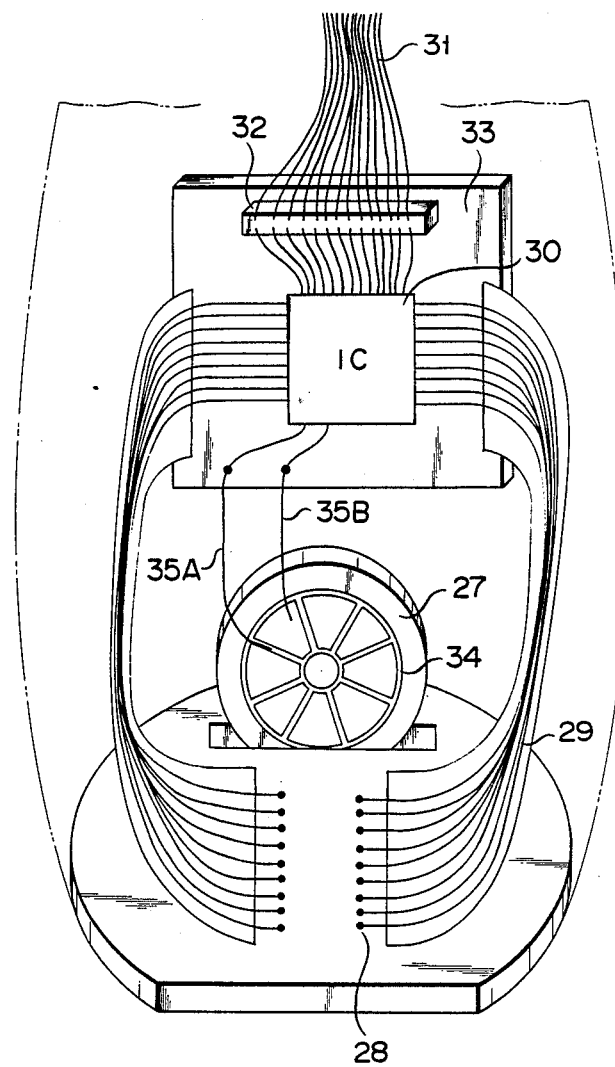
FIG. 4 is a view showing the internal configuration of the printing section shown in FIG. 2.

FIG. 3 shows a bottom portion of the printing section 20 shown in FIG. 2. A printing head heater 26 and a roller 27 are arranged at the bottom portion of the printing section 20. The roller 27 constitutes a speed detector for detecting the speed at which the printing head is moved. The roller 27 is brought into contact with a paper sheet, and is rotated thereon when the printing section 20 is moved on the paper sheet. FIG. 4 shows the internal arrangement of the printing section 20 after a cover is removed therefrom. A portion 28 at the rear surface of the base 21 has lead wires connected to the heater 26 through through holes. The portion 28 is electrically connected to an IC 30 through flat cables 29. Lines 31, constituting the cable 22 shown in FIG. 2, are connected to the IC 30 through a connector 32. The IC 30 and the connector 32 are fixed on an IC circuit board 33. The IC 30 has a control circuit therein. A conductor 34 is radially adhered to the surface of the roller 27 and in an arcuated shape. A brush 35A is in contact with the arcuated portion of the conductor 34, and a brush 35B is brought into contact with a radial portion thereof. The proximal ends of the brushes 35A and 35B are connected to the IC 30 through lead wires. When the roller 27 is rotated, the brushes 35A and 35B repeat electrical connection and disconnection, so that electrical signals are transmitted to the IC 30.

Figure 5:
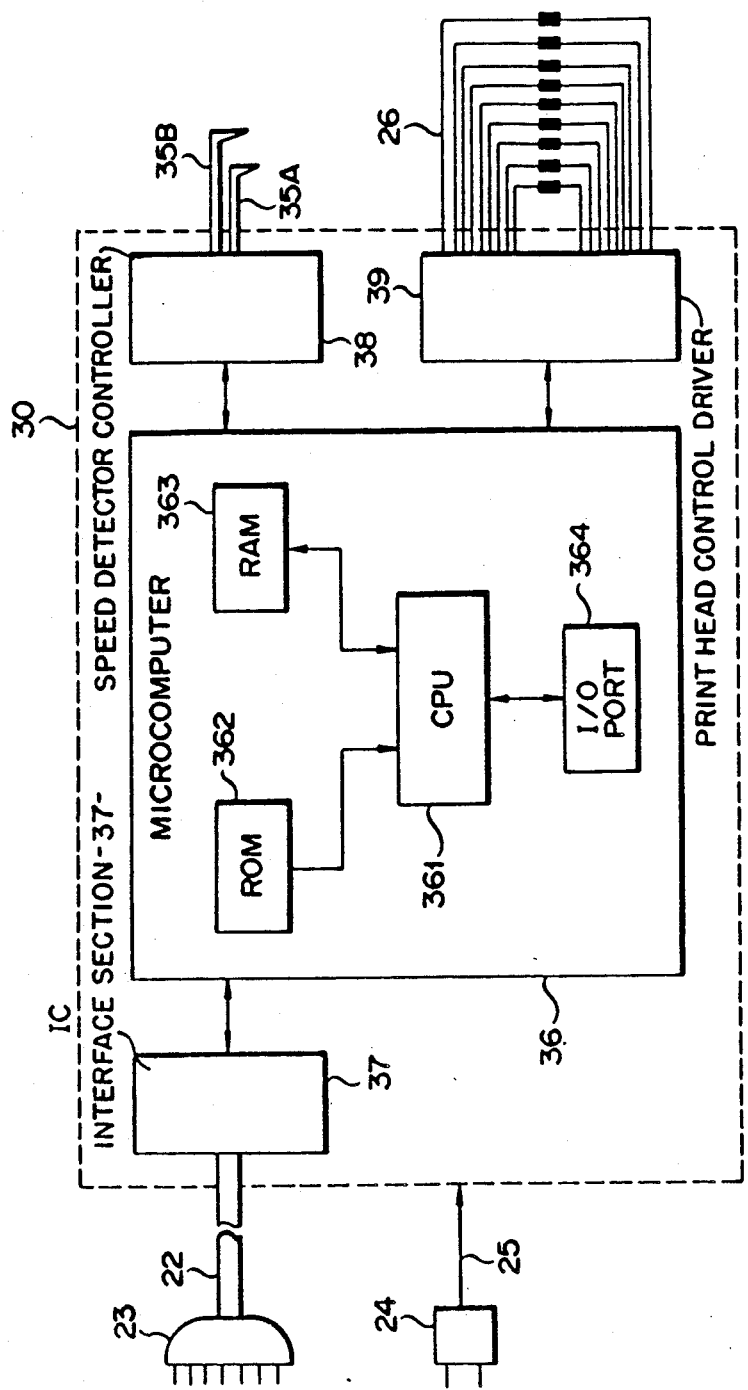
FIG. 5 is a detailed block diagram of an IC shown in FIG. 4.

FIG. 5 is a block diagram showing the control circuit of the IC 30. An interface section 37 for exchanging data with a main unit (not shown), a speed detector controller 38 connected to the brushes 35A and 35B shown in FIG. 4, and a print head control driver 39 for driving the printing head heater 26 are connected to a microcomputer 36.

The microcomputer 36 comprises a central processing unit (CPU) 361, a read-only memory (ROM) 362 for storing the control programs as illustrated in the flow charts in FIGS. 7A and 7B, FIGS. 11A and 11B, and FIGS. 19A and 19B, a random access memory (RAM) 363 for storing data, and an I/O port 364. The CPU 361 can comprise a Zilog Z80 (U.S.A.). The control circuit is energized by the AC adapter 24 and is operated such that the microcomputer 36 fetches the velocity change data of the printing section 20, which is received from the speed detector controller 38, and drives the print head-control driver 39 in accordance with a timing which corresponds to the velocity of the printing section 20. The roller 27, the brushes 35A and 35B, and the speed detector controller 38 constitute a velocity detector. The print head-control driver 39 can comprise a T-1538 which is available from Toshiba Corporation, Kawasaki-shi, Japan.

Figure 6:
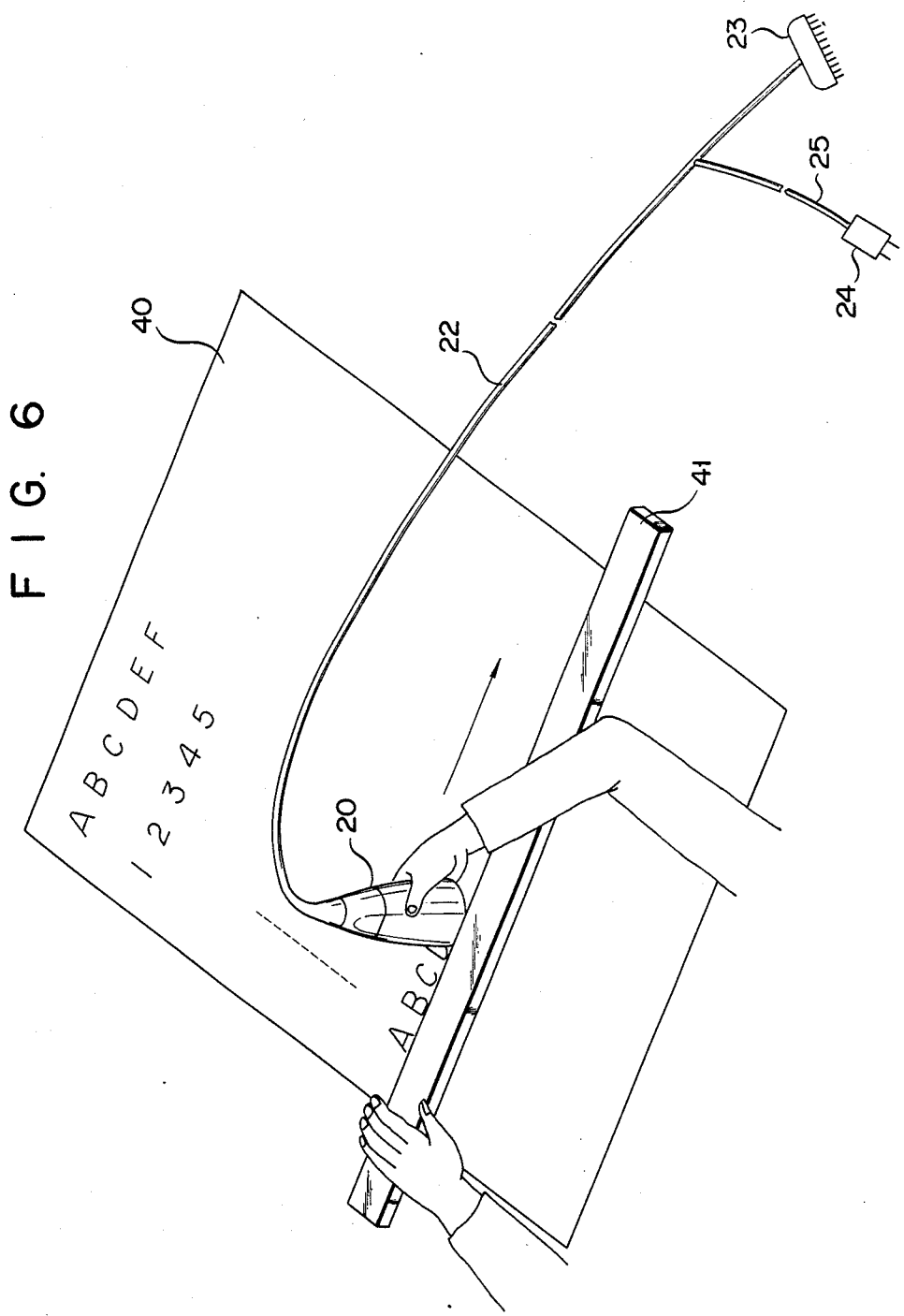
FIG. 6 is a perspective view showing printing procedures wherein an operator moves the printing section on the paper sheet.

The operation of the printing apparatus having the construction described above will be described. Assume that the printing section 20 is manually moved from the left to the right on a paper sheet 40, as shown in FIG. 6. A ruler 41 is used to ensure linear movement of the printing section 20. In this condition, the roller 27 is rotated as shown in FIGS. 3 and 4, and the brush 35B crosses the radial portions of the conductor 34, so that the brushes 35A and 35B repeat electrical connection/disconnection. Each time the brushes 35A and 35B form a short circuit, an interrupt signal is supplied from the speed detector controller 38 (FIG. 5) to the microcomputer 36.

Figure 7A:
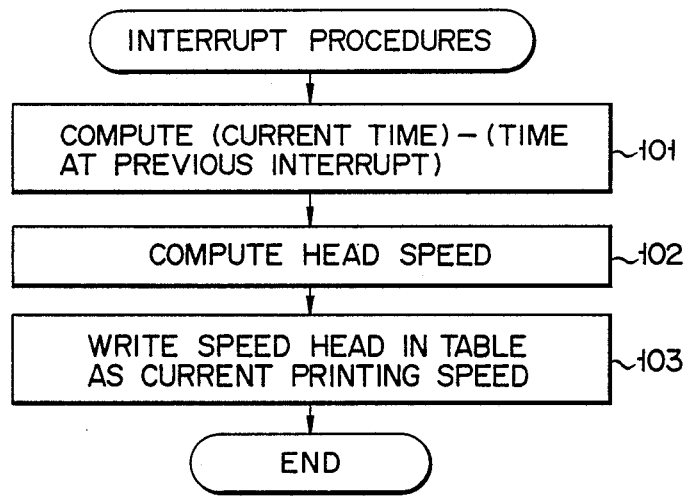
FIG. 7A is a flow chart for explaining interrupt processing of the microcomputer shown in FIG. 5.

When such an interrupt signal is supplied from the speed detector controller 38 to the microcomputer 36, interrupt procedures, shown in FIG. 7A, are performed. In step 101, a time interval between the immediately previous interrupt operation and the current interrupt operation is computed. The speed of the printing section (printing head) is computed in step 102. The computed result is written as the current printing speed in a memory table in step 103. In this manner, every time an interrupt signal is fetched by the microcomputer 36, the microcomputer 36 calculates the speed of the printing section 20, so that updated head speed data is always stored in the memory table. As a result, a change in speed of the printing section 20 can be precisely known.

Figure 7B:
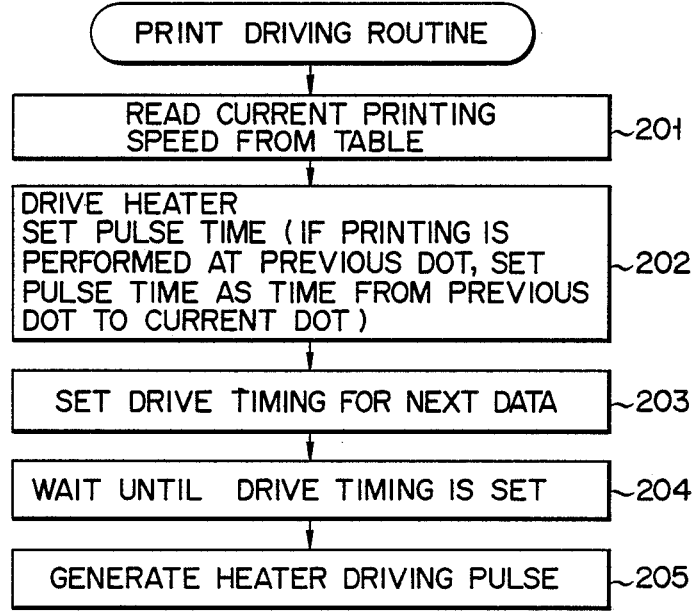
FIG. 7B is a flow chart for explaining printing drive processing thereof.

On the other hand, when printing data is supplied from the main unit to the microcomputer 36 while the printing section 20 is moved, the microcomputer 36 performs a print driving routine, shown in FIG. 7B. Current head speed data, stored in the memory table, is read out therefrom in step 201 so as to obtain the current speed of the printing section 20. The microcomputer 36 detects in step 202 whether or not printing was performed at a previous dot. If so, the microcomputer 36 sets a pulse time as a time from the previous dot to the current dot (i.e., the microcomputer 36 sets a pulse width of the heater 26 by using as a parameter the time interval between printing of the previous dot and the current dot). In step 203, the timing of the driving pulse for the next printing data, which is supplied to the heater 26 through the print head control driver 39, is computed in accordance with the speed of the printing section 20. In this manner, the drive timing for the next printing data is set. In step 204, the microcomputer 36 waits until the preset time is reached. When the printing dot interval in the horizontal direction corresponds to an interval between interrupt signals obtained when the brush 35B crosses the conductor 34, the operation in step 204 is not required. However, when the interval between interrupt signals, at which the brush 35B crosses the conductor 34, corresponds to several printing dots, the operation in step 204 is required. In step 205, the print head-control driver 39 generates a heater driving pulse to the heater 26, so that printing is performed on the paper sheet 40. When the dots are printed, the heater 26 is heated at a relatively high temperature, so that the heater drive pulse duration can be shortened. In addition, a decrease in temperature changes in accordance with the speed of the printing section 20, so that the heater drive-pulse width is determined in consideration of the speed of the printing section 20.

The operation for performing normal printing by changing the drive timing of the printing head heater 26 in correspondence with a change in speed of the printing section 20 will now be described. FIGS. 8A through 8D show changes in speed or velocity of the printing section 20. A velocity curve 42 of the printing section 20 changes as the latter is manually moved. Reference symbols I1, I2, and I3 denote interrupts wherein the interrupt mode is set by a short circuit formed by the brushes 35A and 35B, and corresponding interrupt signals are supplied to the microcomputer 36. A time T1 elapses between the interrupts I1 and I2, and a time T2 elapses between the interrupts I2 and I3. Reference numerals 43, 44, 45, and 46 denote interrupt timings corresponding to printing timings of dots A21, A22, A23, and A24 of a lower left portion of a letter A. FIG. 8A shows a state when the letter A is normally printed. The microcomputer 36 ideally changes timings of print drive pulses with respect to changes in speed of the printing section 20, so that dots constituting the letter A are always printed at proper positions. FIG. 8B shows an ideal printing state wherein the microcomputer 36 changes the timings of the print drive pulses without any significant errors with respect to changes in speed of the printing section 20, so as to properly print the letter A. FIG. 8C shows a case wherein the print drive pulses are generated at a predetermined timing under the control of the microcomputer 36, even when the speed of the printing section 20 changes, and a printed letter is thus deformed. Reference symbols A11, A21, and A31 respectively denote the first lowest left dots of letters A shown in FIGS. 8B, 8C and 8D; A12, A22, and A32, the second lowest-left dots of the letters A. Reference numerals A13, A23, and A33, A14, A24, and A34, and A15, A25, and A35 respectively denote the third, fourth and fifth lowest-left dots of the letters A in FIGS. 8B, 8C and 8D. Reference symbol d1 denotes an error in the printed letter A in FIG. 8C with respect to the normal letter A printed in FIG. 8B; and d2 denotes an error in the printed letter A in FIG. 8D.

FIGS. 8E and 8F are timing charts of print drive pulses. The timing chart in FIG. 8E corresponds to normal printing performed as shown in FIG. 8B, and the timing chart in FIG. 8F corresponds to abnormal printing performed as shown in FIG. 8C. Referring to FIG. 8E, the print drive pulses are delayed to an extent corresponding to a change in speed or velocity of the printing section 20. In particular, since the normal pulse duration (width) is given to be a, the dot A13 is only printed when a time interval (a+b) has elapsed after the dot A12 is printed. The dot A14 is then printed when a time interval (a+b+c) has elapsed after the dot A13 is printed. The delay times b and c correspond to changes in speed of the printing section 20. In this manner, even if the speed of the printing section 20 is reduced, the printed letter A will not be shrunk. Similarly, referring to FIG. 8F, the dot A24 is printed when a time interval (a+b') has elapsed after the dot A23 is printed, and the dot A25 is printed when a time interval (a+b'+c') has elapsed after the dot A24 is printed.

It is understood that the brushes 35A and 35B are short-circuited and an interrupt (velocity detection of the printing section 20) occurs for every two dots in accordance with a relationship between the interrupts I1, I2, and I3 and the interrupt timings 43, 44, and 45. The operator holds the printing section 20, which performs printing on the paper sheet 40, while he moves it from the left to the right. An operation will be described in detail wherein the letter A is properly printed, while the velocity curve 42 of the printing section 20 changes as shown in FIG. 8A. The principle of operation of the thermal serial printer is known, so a detailed description is omitted. In order to obtain the proper shape of the letter A even when a change in the velocity curve 42 occurs, the printing head heater 26 is driven at timings shown in FIG. 8E through a print head control driver 39 in accordance with changes in the velocity curve 42, under the control of the microcomputer 36. More specifically, the drive timing of the printing head heater 26 is delayed by a time interval b (i.e., by an interval corresponding to a decrease in velocity of the printing section 20), and the dot A13 is printed. Subsequently, the drive timing of the printing head heater 26 is again delayed by a time interval (b+c) and the dot A14 is printed, thereby obtaining the printed letter A of normal shape. The microcomputer 36 supplies a drive pulse to the printing head heater 26 when the heater 26 is moved to a position corresponding to proper printing. However, in this case, velocity detection with respect to the printing section 20 is performed once for every two horizontal dots. Therefore, an error occurs when an abrupt change in velocity of the printing section 20 occurs.

FIG. 8F shows a case wherein such an error occurs. When the microcomputer 36 detects the interrupt I2 at the timing 44, the velocity of the printing section 20 is computed, and the printing timing of the next dot A23 is computed. When the time interval a has elapsed, the dot A23 is printed. However, if the velocity of the printing section 20 has in fact decreased, the dot A23 should be printed after the time interval (a+b), so that an error corresponding to the time interval b occurs. Similarly, an error corresponding to a time interval (b+c−b') occurs in printing the dot A24. FIG. 8D shows the case wherein velocity detection of the printing section 20 is not performed and the printing head heater 26 is driven at a predetermined timing. In this case, the resultant letter is horizontally shrunk by the distance d2 with respect to a normal letter. However, in the case shown in FIG. 8C, wherein the change in velocity of the printing section 20 is detected an the drive timing of the printing head heater 26 is changed in accordance with the change in velocity of the printed section 20, an error with respect to a normal letter A is reduced to the distance d1. The timing control of the print drive pulse can be effectively performed even if the velocity of the printing section 20 changes. When the number of interrupt timings within a unit time is increased, an error can be further reduced, so that the printed letter can come closer to an ideal letter A, as shown in FIG. 8B.

In the embodiment described above, the letter is printed in units of dots. The present invention can also be applied to image printing, such as figure printing. In addition, in the above embodiment, the operator directly holds the printing section 20 and moves it to perform printing. However, the printing section 20 may be indirectly moved to obtain the same effect as in the above embodiment. Alternatively, the line feed may be performed such that the paper sheet is fed by a drive mechnanism such as a pulse motor, while the operator moves the printing section only along the horizontal direction. The present invention can also be applied to a thermal transfer printing head to obtain the same effect as in the above embodiment.

Figure 9:
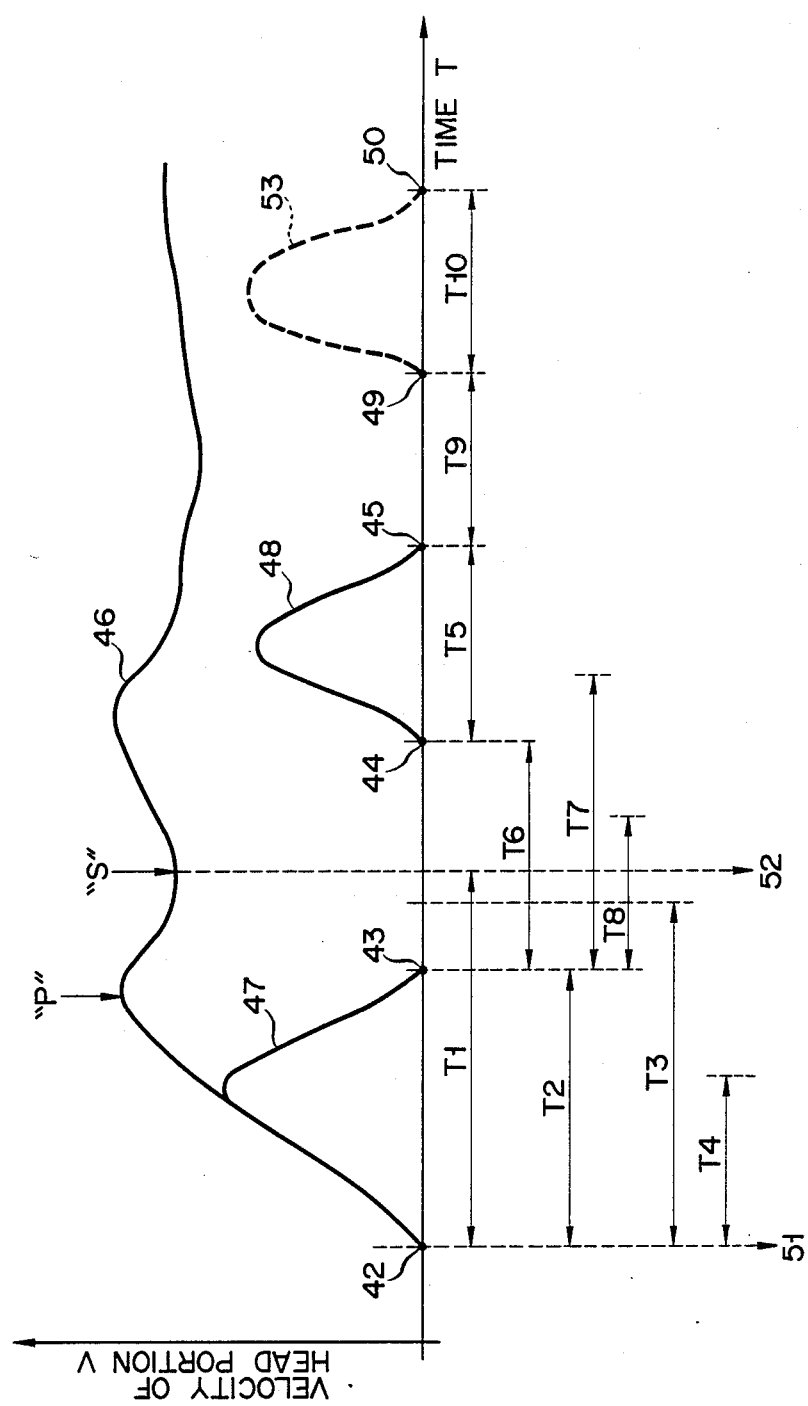
FIG. 9 is a graph showing the velocity of the printing head portion as a function of time.
Figure 11A:
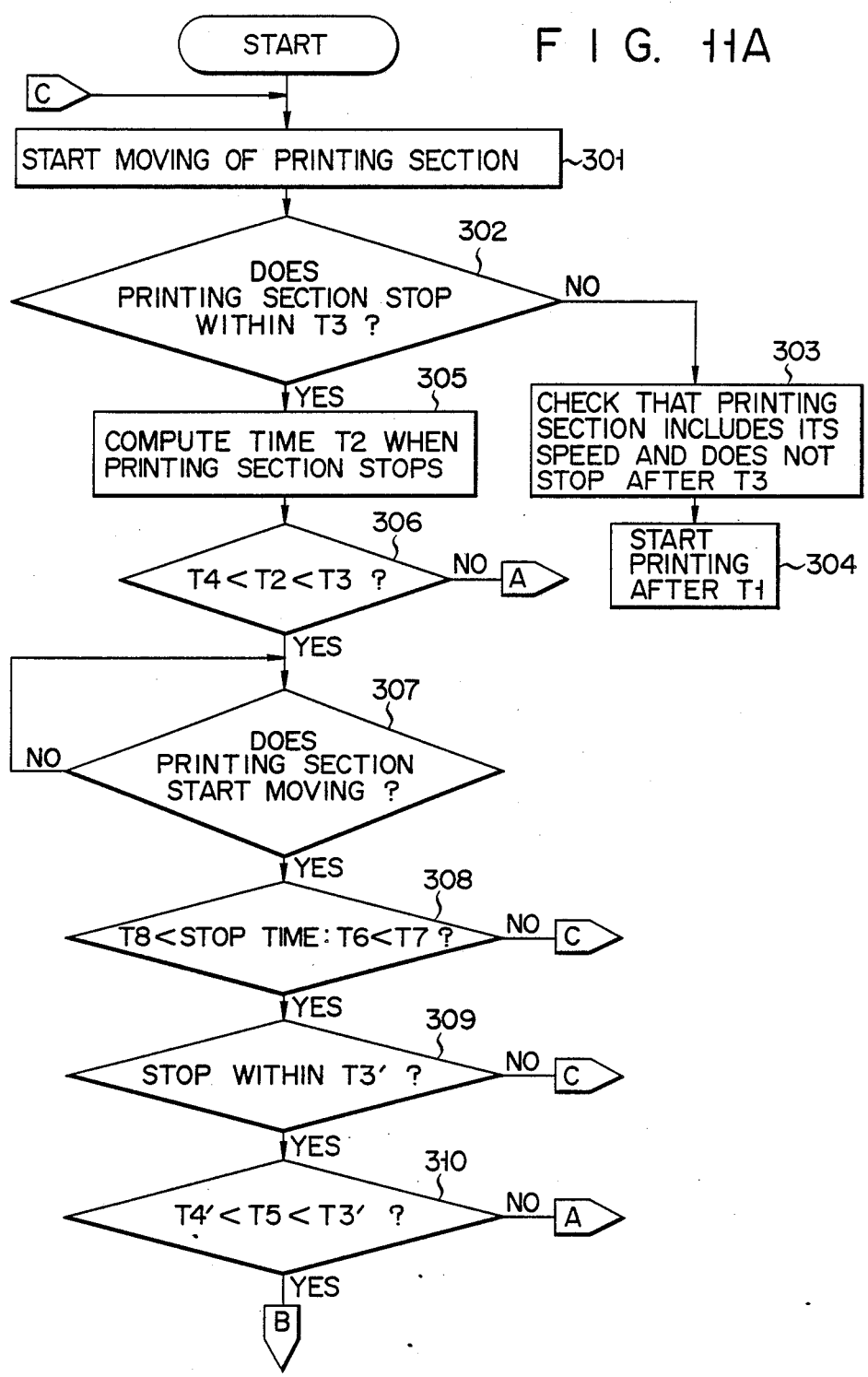
FIGS. 11A and 11B respectively are flow charts for explaining the control operations of the microcomputer built into the printing section shown in FIG. 10.
Figure 11B:
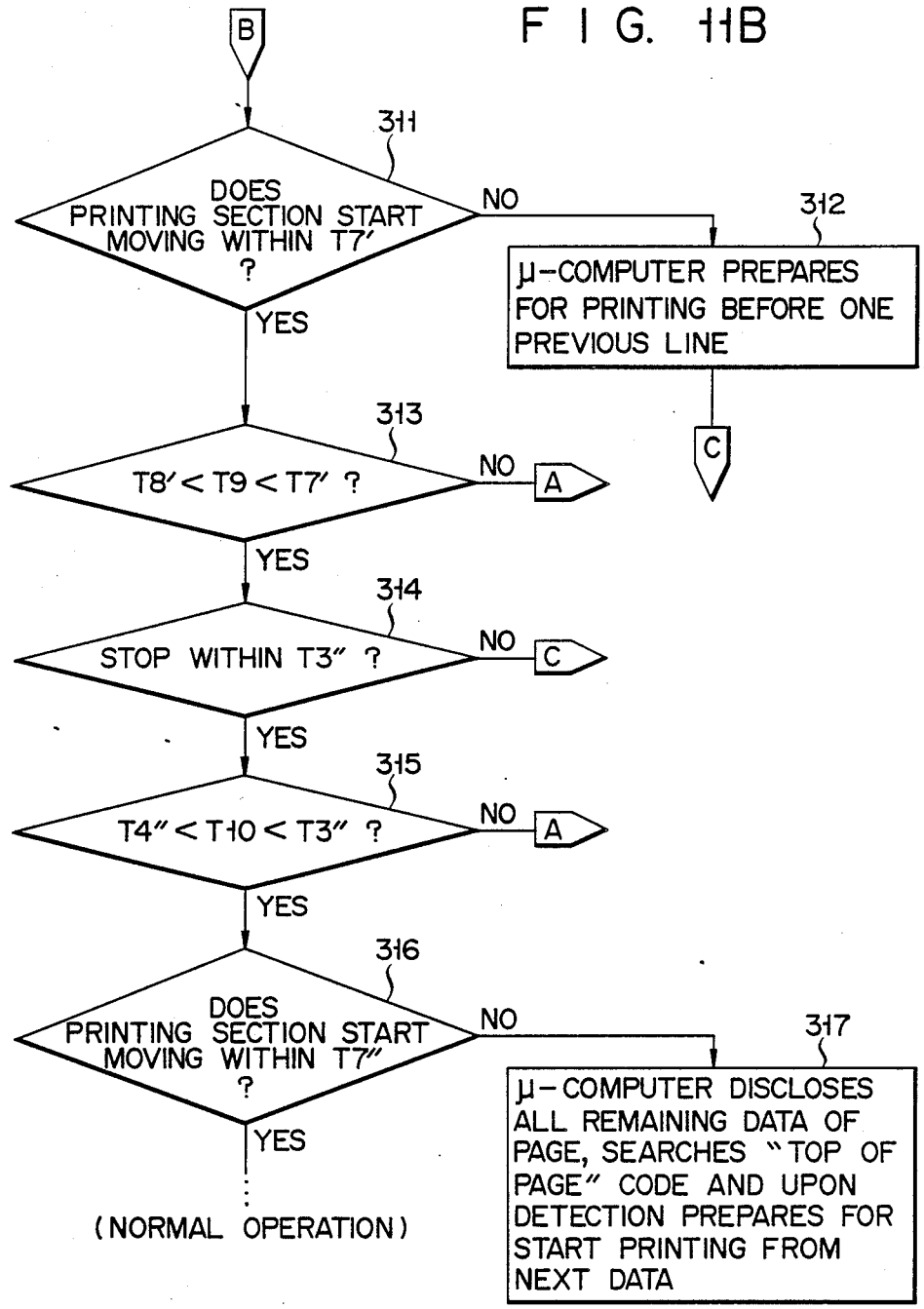

An operation will now be described for achieving various functions required by the operator by means of repeated start/stop movement of only the printing section 20. FIG. 9 is a graph showing changes in the velocity of the printing section (printing head) 20 as a function of time. Movement of the printing section 20 may be started at start time 42 and continued past a print start point "S" so as to describe a velocity curve 46, thereby completing one-line printing. The curve 46 shows changes in the velocity of the printing section 20 as it is moved manually. Alternatively, the printing section 20 is started at start time 42, moved to describe a velocity curve 47, and stopped at time 43. Similarly, the printing section 20 is started again at start time 44, moved to describe a velocity curve 48, and stopped at time 45. Subsequently, the printing section 20 is started at start time 49, moved to describe a dotted velocity curve 53, and stopped at time 50. Referring to FIG. 9, reference numeral T1 denotes a time interval between time 42 and the printing start point S; T2, a time interval between time 42 and time 43; T3, a time interval between time 42, and a time between time 43 and time 44; T4, a time interval between time 42, and a time between time 42 and time 43; T5, a time interval between time 44 and time 45; T6, a time interval between time 43 and time 44; T7, a time interval between time 43, and a time between time 44 and time 45; T8, a time interval between time 43, and a time between time 43 and 44; T9, a time interval between time 45 and time 49; and T10, a time interval between time 49 and time 50.

FIG. 10 shows a state wherein the operator performs printing while holding the printing section 20 and moving it from the left to the right. Reference numeral 51 denotes alphanumeric characters printed on the paper sheet 40. Referring to FIG. 10, the operator locates the printing section 20 at a start position mark SA in readiness for moving the printing section 20 to the right. The curve 46, shown in FIG. 9, shows changes in velocity of the printing section 20 when the printing section 20 is moved to the right and characters are printed on the paper sheet 40. In this case, the velocity of the printing section 20 is increased from time 42 and peaks at point "P". Subsequently, when the printing section 20 is moved slightly further to the right, printing is started at the point "S". Points 51 and 52, shown in FIG. 10, respectively correspond to time 42 and the print start time S.

When the printing section 20 is moved by a predetermined distance, the microcomputer 36, shown in FIG. 5, fetches distance data by a combination of rotation of the roller 27 and behavior of the brushes 35A and 35B. The microcomputer 36 then computes a displacement and velocity of the printing section 20. Therefore, the microcomputer 36 detects that movement of the printing section 20 is started at time 42 of FIG. 9. Unless the speed of the printing section 20 becomes zero after the time interval T3, printing is started at time S. In this manner, immediate printing is not performed since a change in the velocity of the printing section 20 between time 42 and a time corresponding to the print start point S (between the positions 51 and 52 in FIG. 10) is abrupt and would disable high-quality printing. After the velocity of the printing section 20 is stablized, following a time corresponding to the peak velocity "P", printing is started.

However, when the printing section 20 is stopped at time 43 after being started at time 42 so as to establish a relation T4<T2<T3, the microcomputer 36 computes the time interval T2 in accordance with data supplied from the speed detector controller 38 thereto. The microcomputer 36 then compares the time interval T2 with preset time intervals T4 and T3 so as to detect the relation T4<T2<T3. In this case, the microcomputer 36 detects that a function, given by a definition to be described later, is being requested by the operator. Subsequently, when the printing section 20 is stopped for the time interval T6 between time 43 and time 44 and is started again from time 44, the microcomputer 36 computes the time interval T6 and then the time interval T5, and detects a relation T4<T5<T3. Therefore, the microcomputer 36 detects that another function, given by a corresponding definition to be described later, is being requested by the operator.

A definition may be given in the microcomputer 36 such that the printing section 20 must print the previous line again when the printing section 20 is first moved along the curve 47 and is then moved along the curve 48 after the time interval T6 has elapsed. When the printing section 20 is moved along the curve 46 after time 45, printing is repeated since the printing data of the previous line is left in the data buffer memory. Another definition may be given such that printing data of a given page is not printed when the printing section 20 is moved along the curve 47, is stopped for the time interval T6, is moved again along the curve 48, is stopped for the time interval T9, and is then moved along the curve 53 (i.e., when a start/stop operation of the printing section 20 is repeated three times at short invervals). When the printing section 20 is moved so as to perform this repeat operation, the microcomputer 36 delays operation of the printing head until a page feed code (top of page code) is detected. The microcomputer 36 then performs printing of the next page. On the other hand, if still another definition is given such that another processing operation is requested when the printing section 20 performs start/stop operation for time intervals T2, T6, T5, T9, T10, ..., the microcomputer 36 detects the corresponding request and performs predetermined processing.

FIG. 11 is a flow chart of the above-mentioned operation by the microcomputer 36. In step 301, the microcomputer 36 detects that movement of the printing section 20 has been started. The microcomputer 36 checks in step 302 whether or not the printing section 20 has been stopped within the time interval or time T3. If NO in step 302, the speed or velocity of the printing section 20 is increased in step 303. Subsequently, if the microcomputer 36 detects that the printing section 20 has not been stopped after time T3, printing starts when the time interval T1 has elapsed after movement of the printing section 20 has been started. However, if YES in step 302, the microcomputer 36 computes a time interval T2 between the start time and the stop time. Subsequently, the microcomputer 36 detects in step 306 whether or not a relationship T4<T2<T3 has been established. If NO in step 306, the operation is ended. However, if YES in step 306, the microcomputer 36 checks whether or not the printing section 20 has started moving again. If YES in step 307, the microcomputer 36 checks in step 308 whether or not a relationship T8<T6<T7 has been established. If NO in step 308, the flow returns to step 301. However, if YES in step 308, the microcomputer 36 checks in step 309 whether or not the printing section 20 has been stopped within a time interval T3'. If NO in step 309, the flow returns to step 301. However, if YES in step 309, the flow advances to step 310. It should be noted that the time interval T3' is the time between time 44, and a time between time 45 and time 46. The microcomputer 36 checks in step 310 whether or not a relationship T4'<T5<T3' is established. If NO in step 310, the routine is ended. However, if YES in step 310, the flow advances to step 311. It should be noted that the time interval T4' is a time between time 44, and a time between time 44 and time 45. The microcomputer 36 checks in step 311 whether or not the printing section starts moving again within a time interval T7'. If NO in step 311, the microcomputer 36 prepares for printing from the immediately preceding line in step 312. The flow then returns to step 301. However, if YES in step 311, the flow advances to step 313. It should be noted that the time interval t7' is a time between time 45, and a time between time 49 and time 50. The microcomputer checks in step 313 whether or not a relationship T8'<T9<T7' is established. If NO in step 313, the routine is ended. However, if YES in step 313, the flow advances to step 314. It should be noted that the time interval T8' is a time between time 45, and a time between time 45 and time 49. The microcomputer 36 checks in step 314 whether or not the printing section 20 stops within a time interval T3''. If NO in step 314, the flow returns to step 301. However, if YES in step 314, the flow advances to step 315. It should be noted that the time interval T3'' is a time between time 49, and a time between time 50 and the next start time of the printing section 20. The microcomputer 36 checks in step 315 whether or not a relationship T4''<T10<T3'' is established. If NO in step 315, the routine is ended. However, if YES in step 315, the flow advances to step 316. It should be noted that the time interval T4'' is a time between time 49, and a time between time 49 and time 50. The microcomputer 36 checks in step 316 whether or not the printing section 20 starts moving within a time interval T7''. If NO in step 316, the flow advances to step 317. However, if YES in step 316, the same operation as described above is repeated. It should be noted that the time interval T7'' is a time between time 45, and a time between time 49 and time 50. In step 317, the microcomputer 36 discloses all remaining data of the current page and searches the "top of page" code. Upon detection of this code, the microcomputer 36 prepares to start printing from data next to the "top of page" code. Thereafter, the flow returns to step 301. In the above operation, the following relationship may be established: T1>T2+T6+T5+T9+T10+ . . .

Figure 12:
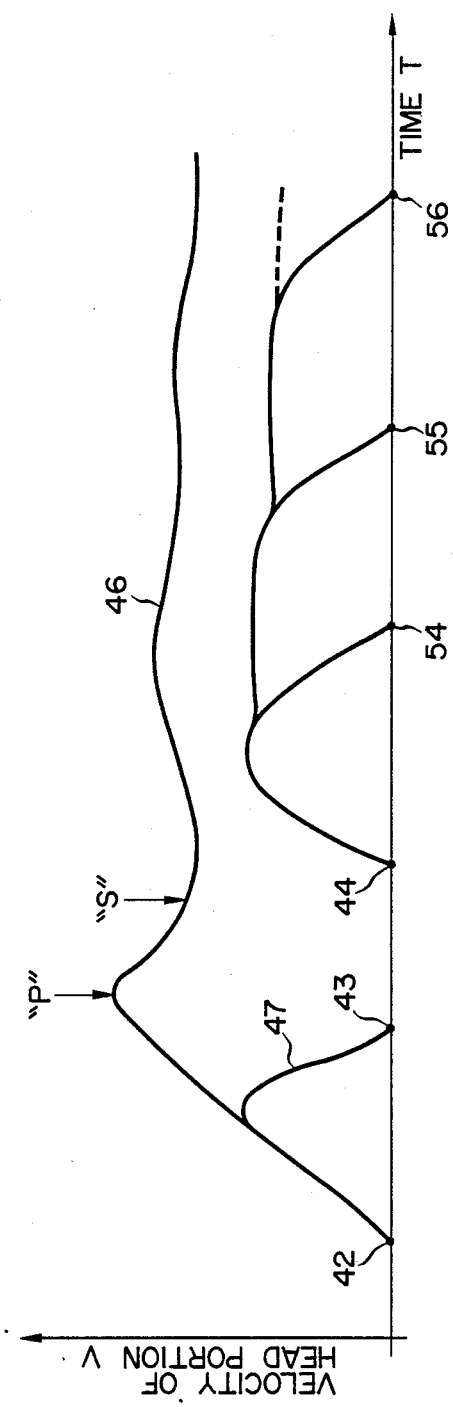
FIGS. 12 through 14 are graphs respectively showing changes in velocity of the printing section shown in FIG. 10.

FIG. 12 shows another case wherein repeated start/stop operation of the printing section 20 is performed so as to cause the microcomputer 36 to detect an operator request. Assume that a velocity curve 47, described by the printing section 20, is the same as that shown in FIG. 9, and that the relationships T4<T2<T3<T1 and T8<T6<T7 are established. Under these assumptions, the microcomputer 36 built into the printing section 20 detects the operator request. Referring to FIG. 12, when the microcomputer 36 detects that the printing section 20 is started again at time 44 and stopped at time 54, the microcomputer 36 detects an operator request defined in accordance with the above operation, and performs this operator request. However, when the microcomputer 36 detects that the printing section 20 is started at time 44 and stopped at time 55, the microcomputer 36 detects another operator request defined by the above operation, and performs this operator request. Similarly, when the microcomputer 36 detects that the printing section 20 is started at time 44 and stopped at time 56, the microcomputer 36 detects still another operator request defined by the above operation, and performs this operator request. The relationships between the start and stop timings define various operator requests which can be detected by the microcomputer 36.

Figure 13:
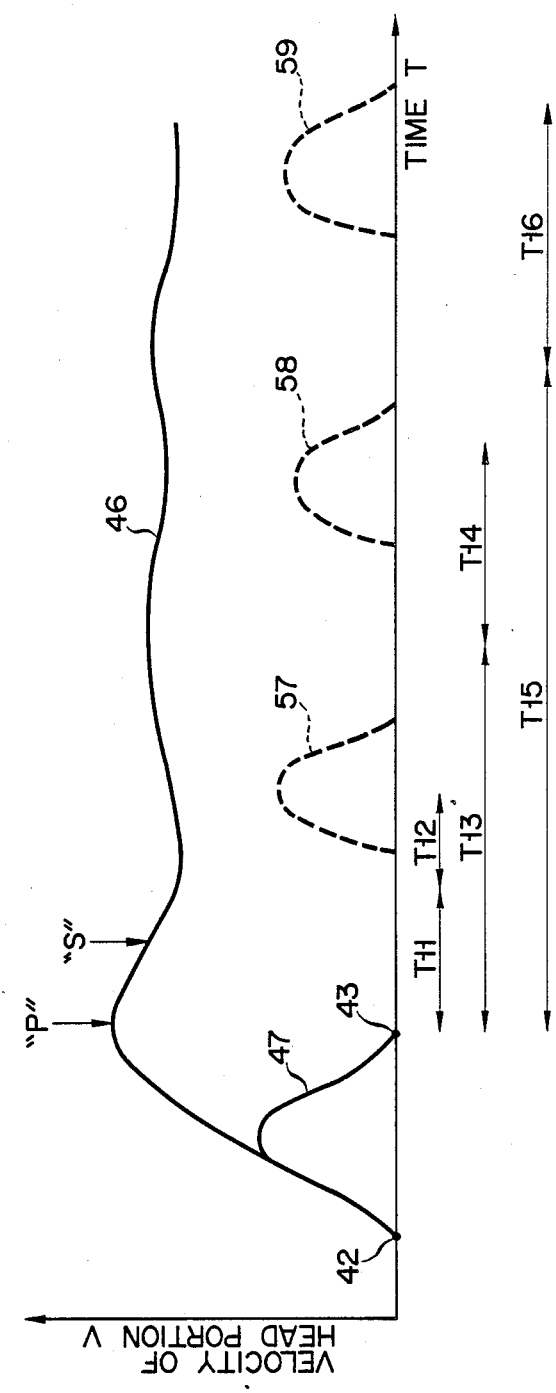
Figure 14:
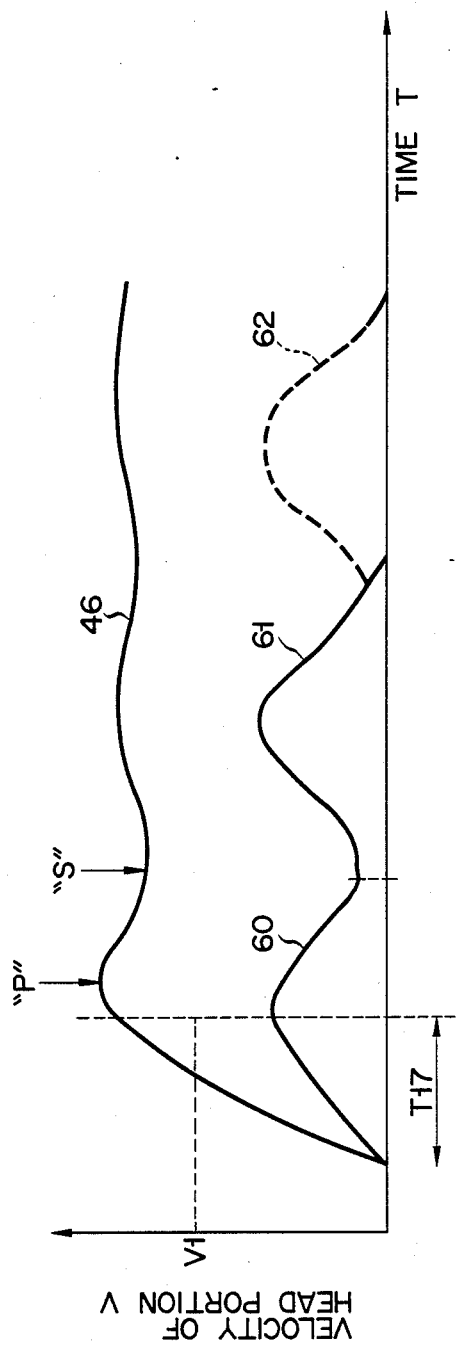

FIG. 13 shows still another case wherein an operator request is detected by the microcomputer 36 in accordance with the behavior of the printing section 20. The printing section 20 is moved to describe a curve 47 under the same conditions as in FIGS. 9 and 12. The printing section 20 is started at time 42 and moved to describe the curve 47. The printing section 20 then stops at time 43. When a time interval T11 has elapsed, the printing section 20 is moved again within 0 to T12. In this case, the microcomputer 36 detects a predetermined operator request defined by the above operation, and performs this operator request. In another case, the printing section 20 may be moved to describe the curve 47, stopped at time 43, kept stationary for a time interval T13, and started again within 0 to T14. In this case, the microcomputer 36 detects another operator request, and performs this operator request. Still another case is presented. In particular, the printing section 20 is moved to describe the curve 47 and stopped at time 43. When a time interval T15 has elapsed, the printing section 20 is started again within 0 to T16. In this case, the microcomputer 36 detects still another operator request, and performs this operator request. In this mode of operation, the operator requests are defined by time intervals after the printing section 20 has described corresponding velocity curves but before printing is started.

In addition to the above-mentioned definitions of operator requests, various other definitions of operator requests can be given in accordance with various behaviors of the printing section 20. In the case shown in FIG. 13, when the printing section 20 is started at time 42, moved to describe the curve 47, and stopped at time 43, this sequence of displacements can be given as a single operator request. On the other hand, when the printing section 20 is moved to describe the curve 47 and then the curve 57, the microcomputer 36 can detect the movement of the printing section to be another operator request. In the case in FIG. 13, assume that the operator releases the printing section 20 after the printing section 20 has been moved to describe the curve 47 and has been stopped. The microcomputer 36 detects the operator requests only when the printing section 20 is moved within 0 to T12, 0 to T14, and 0 to T16 after the time intervals T11, T13 and T15. When the printing section 20 is in fact stopped after being moved to describe the curve 47, and the printing section 20 is usually stopped for a time interval exceeding the time interval (T15+T16), this sequence of operations is defined such that no operator request is given. Therefore, erroneous operation by the operator and the microprocessor can be prevented.

The repeated stop/start operation of the printing section 20 causes the microcomputer 36 to detect various operator requests. In fact, the printing section 20 is started and then stopped and vice versa within a predetermined time interval or distance before normal printing is started, so that a predetermined operator request is detected by the microcomputer 36. The microcomputer 36 then performs this operator request. In the cases described above, when the printing section 20 is started from time 42 and stopped midway, the microcomputer 36 continues normal printing even if the printing section 20 performs a start sequence at time 42, movement to describe the curve 47, stop at time 43, and movement to describe the curve 48 and then the curve 53. In addition, when the printing section 20 is stopped during printing, the microcomputer 36 can detect this interruption as an error.

Another case will be described wherein an operator request is detected by the microcomputer 36 in accordance with the behavior of the printing section 20. In this case, when the printing section 20 is moved for a predetermined distance and a predetermined time interval (T17) after the printing start time 42 has elapsed, it is detected that the velocity of the printing section 20 exceeds a predetermined velocity V1. Since the microcomputer 36 can detect the velocity or speed of the printing section 20 every time the printing section 20 is moved by the predetermined distance, the microcomputer 36 can then compute the velocity of the printing section when the time interval T17 has elapsed. In this case, when the velocity of the printing section 20 exceeds V1, the microcomputer 36 causes the printing section 20 to print at the time S when the printing section 20 is moved for the predetermined distance. However, if the velocity of the printing section 20 is lower than the velocity V1 when the time interval T17 has elapsed, the microcomputer 36 detects an operator request. For example, when the velocity of the printing section 20 is cyclically decreased to describe curves 60 and 61, the microcomputer 36 detects that two peaks are present along the curves 60 and 61. In other words, the microcomputer 36 detects an operator request corresponding to the two peaks and performs operations to comply with the operator request. Similarly when the velocity of the printing section 20 is changed to describe curves 60, 61 and 62, the microcomputer 36 detects three peaks. The microcomputer 36 then detects another operator request and performs operations accordingly. In this case, unlike the previous cases, operator requests are detected in accordance with changes in the velocity of the printing section 20. The microcomputer 36 detects these changes in the velocity of the printing section 20 and performs the corresponding operator requests.

The printing section 20 need not be started from the start point mark SA. The operator request can be signalled to the microcomputer 36 in a manner wherein the printing section 20 is stopped, lifted from and replaced at the stop position, and moved to perform repeated start/stop operation. In addition, this signalling operation need not be performed on the paper sheet 40. Furthermore, the definitions of the operator requests can be prestored in the microcomputer 36 memory or the like.

According to this embodiment, the printing head heater 26, the roller 27, the IC 30 having the control circuit, and the like constitute the printing section 20. The operator holds the printing section 20 and performs scanning on the paper sheet 40. The microcomputer 36 in the control circuit changes the drive timings of the heater 26 so as to print letters of a normal shape in accordance with changes in velocity of the printing section 20. Therefore, the horizontal scanning mechanism and the line feed mechanism can be omitted. In particular, the scanning distance of the printing section 20 can be increased without increasing the size of the horizontal scanning mechanism and the line feed mechanism. As a result, printing can be economically performed on a large paper sheet. In addition, since the horizontal scanning mechanism and the line feed mechanism are eliminated, power consumption can be decreased. Furthermore, noise can be substantially eliminated.

According to this embodiment, various operator requests are defined in accordance with the travel time interval (or stop time interval), number of shifts, and changes in velocity of the printing section 20 under repeated start/stop operation. The microcomputer detects one of these operator requests in accordance with the type of behavior of the printing section 20, and performs the detected operator request, so such requests as start, stop, and page feed can be performed without arranging a key switch. Furthermore, the operator request can be signalled by simply repeating the start/stop operation of the printing section 20. As a result, the printing efficiency will not be impaired.

Figure 15:
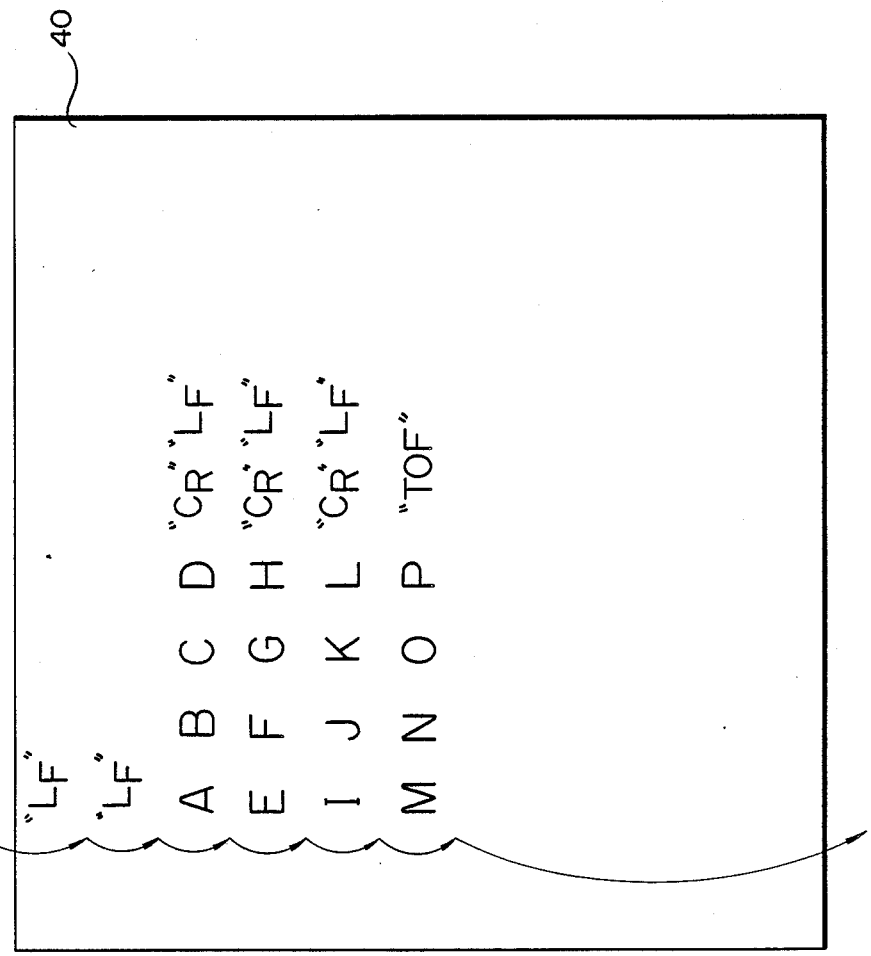
FIG. 15 is a view showing a printed state when printing data are printed by the conventional printing apparatus shown in FIG. 1.

The operation will now be described wherein the printing section 20 starts printing letters from a predetermined position on the paper sheet 40. FIG. 15 shows a case wherein printing data transmitted from a main unit is printed by a conventional printing apparatus on the paper sheet 40. Referring to FIG. 15, CR, LF and TOF are not actually printed and are called control codes. The printing apparatus detects these control codes from the printing data. If the detected code is LF, one-line feed is performed. When the detected control code is CR, the printing head is returned to the leftmost print start position. When the detected control code is TOF, the paper sheet is fed until the printing head is aligned with a start line of the next page. In this manner, characters ABCD, EFGFH, ... are printed on the nth, n+1th lines, ...

Figure 16:
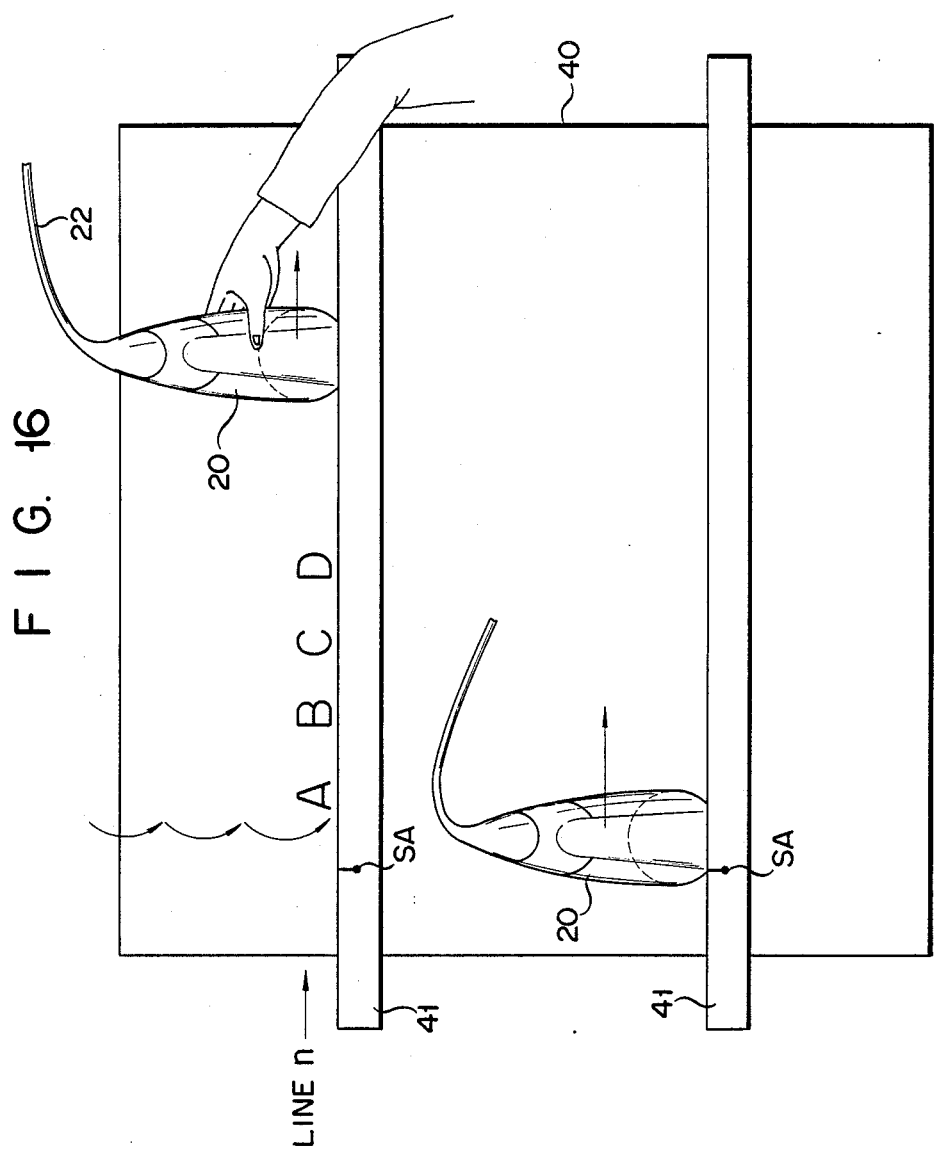
FIG. 16 is a view showing a printed state when printing data are printed by the printing apparatus of the present invention.
Figure 17:
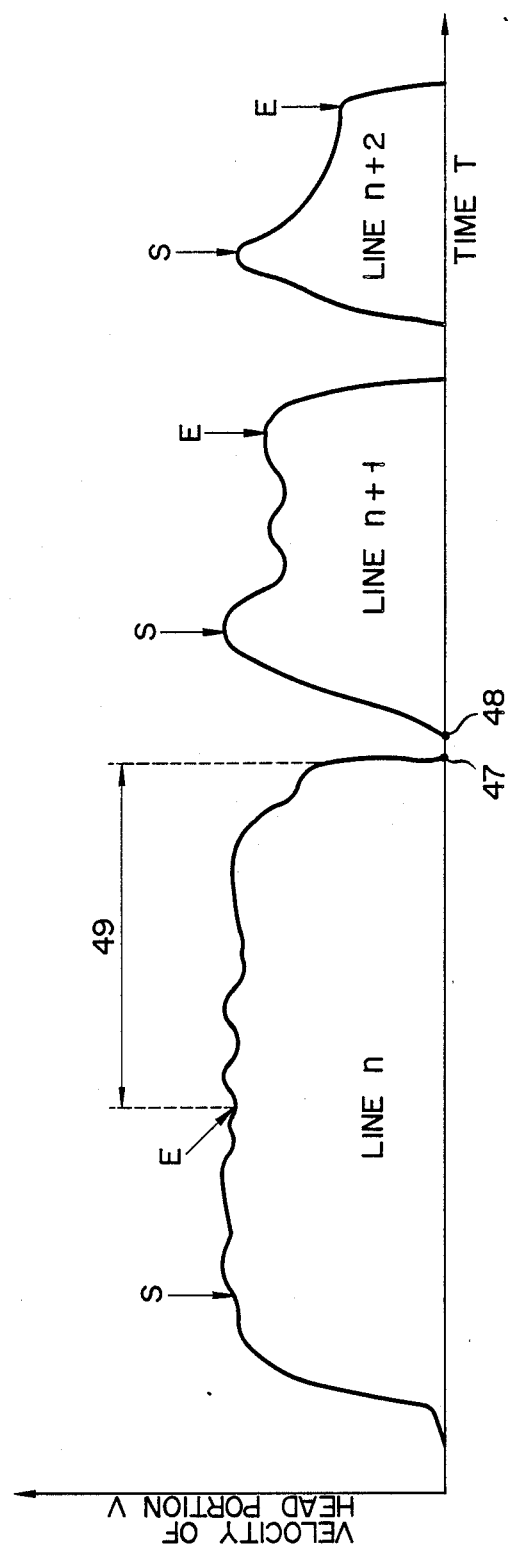
FIG. 17 is a graph showing a change in the velocity of the printing section between the nth and n+1th lines.
Figure 18:
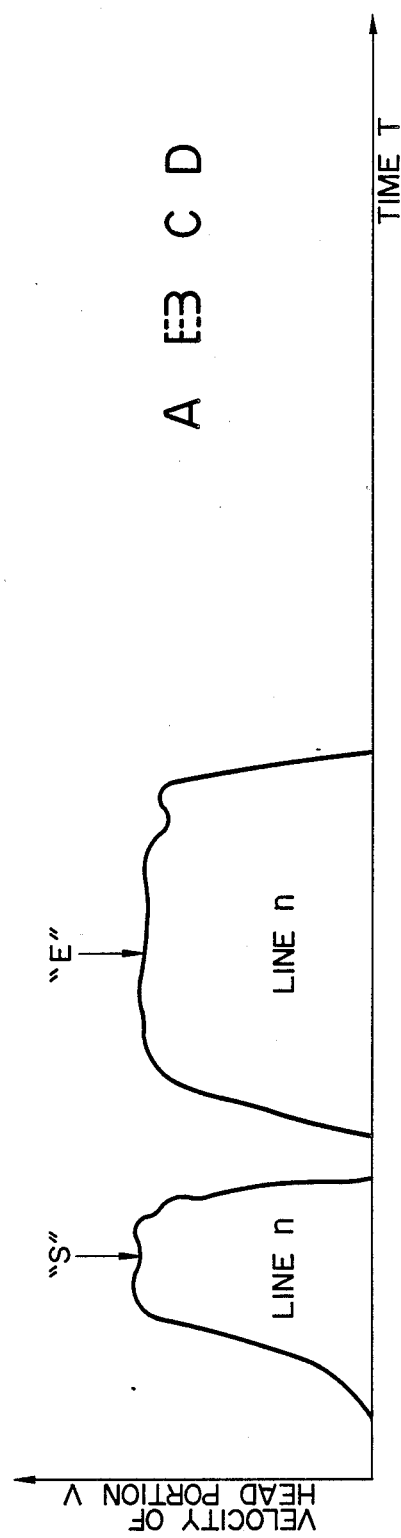
FIG. 18 is a graph showing a change in velocity when the printing section is temporarily interrupted during printing.

FIG. 16 shows a case wherein the same printing data as in FIG. 15 are printed by the printing section 20. The operator manually moves the printing section 20 along the ruler 41 in the direction indicated by the arrow to print the characters ABCD ... on the paper sheet 40. FIG. 17 shows changes in velocity of the printing section 20 between the nth and n+2th lines. Reference numeral S denotes a printing start time; and E denotes a printing end time. Reference numeral 47 denotes a time at which the velocity of the printing section 20 becomes zero; 48 denotes a time at which the printing section 20 is started again. Reference numeral 49 denotes a time interval during which the printing section 20 is moved but does not perform printing. FIG. 18 shows a case wherein a change in velocity of the printing section 20 occurs when the printing section 20 is temporarily stopped while the the nth line is being printed. Characters ABCD on the right-hand side of FIG. 18 are the printed letters.

Printing data are supplied from the main unit to the printing section 20 through the cable 22. In particular, codes "LR", "LF", A, B, C, D, "CR", "LF", E, F, G, H, "CR", "LF", I, J, K, L, "CR", "LF", M, N, O, P, and "TOF" are transmitted from the main unit to the control circuit shown in FIG. 5. The capacity of the buffer determines whether or not these codes are received by the control circuit in a parallel manner. However, the capacity of the buffer is not an issue in this specification. The operation will be described wherein the printing section 20 performs printing on the nth line in FIG. 16. The printing section 20 starts printing at start point S, as shown in FIG. 17, and prints characters ABCD on the nth line. Thereafter, the microcomputer 36 in the control circuit detects the control codes "CR" and "LF", and the printing section 20 stops printing at time E. Therefore, even if the printing section 20 is moved, characters EFGH will not be printed on the next line. When the printing section 20 completely stops at time 47 in FIG. 17 and is started again at time 48, the microcomputer 36 detects that the printing section 20 is started for printing of the n+1th line. The printing section 20 then starts printing characters EFGH at point S and completes printing at time E. Normally, the printing section 20 is moved to the left start position mark SA on the ruler 41 of FIG. 16 between time 47 and time 48. The n+2th line is printed in the same manner as described above. The printing positions of the respective lines can be aligned since printing is always started from the mark SA. FIG. 18 shows a case wherein the printing section 20 temporarily stops on the nth line during printing of letter B and is started again. When the microcomputer 36 detects the zero velocity of the printing section 20, the printing section 20 stops printing the letter B. When the printing section 20 is started again, the remaining portion of letter B is printed. Subsequently, letters C and D are printed, and the printing section 20 stops at time E.

In the printing operation described above, the microcomputer 36 receives velocity data of the printing section 20 from the speed detector controller 38. When the microcomputer 36 detects the control codes "CR" and "LF", the printing section 20 temporarily stops. When the printing section 20 is started again, the microcomputer 36 detects the line feed. However, when the microcomputer 36 detects that the printing section 20 has stopped during printing, the microcomputer 36 causes the printing section 20 to immediately interrupt printing. When the printing section 20 is started again, printing is restarted.

Figure 19A:
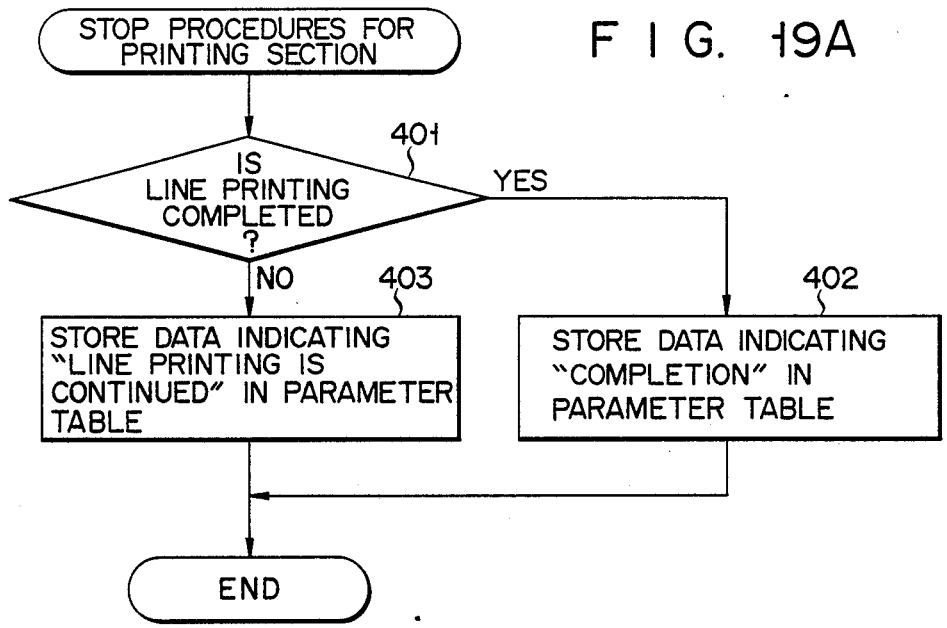
FIGS. 19A and 19B are flow charts for explaining the printing head start and stop modes, respectively.
Figure 19B:
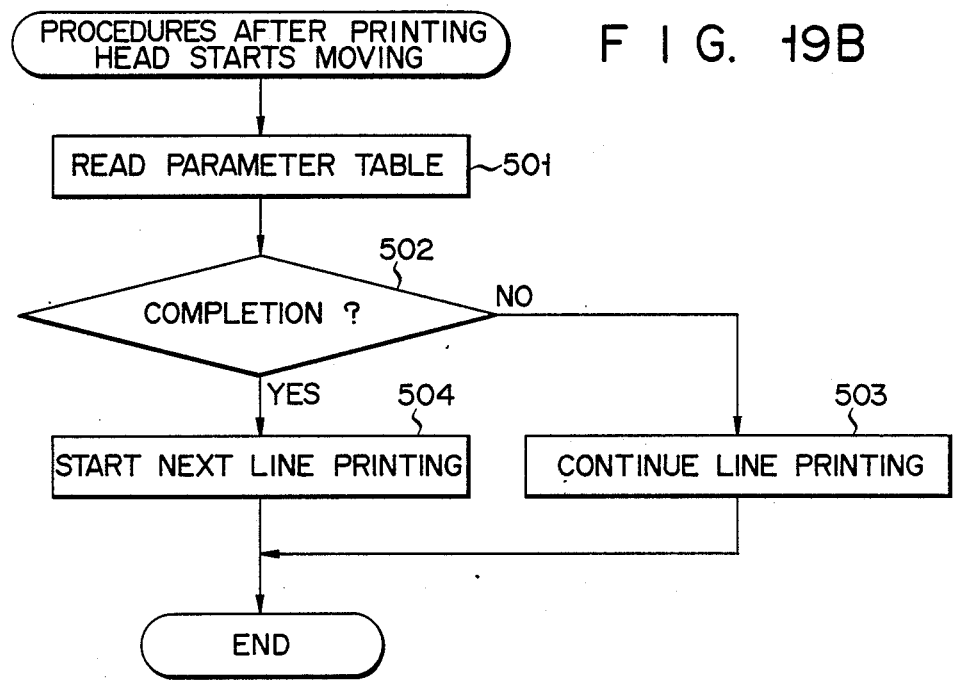

FIGS. 19A and 19B are respectively flow charts for explaining stop procedures of the printing section 20 under the control of the microcomputer 36 of FIG. 5 and procedures after the printing section starts moving. According to the flow chart of FIG. 19A, the microcomputer 36 checks in step 401 whether or not line printing is completed. If YES in step 401, the flow advances to step 402 wherein data indicating "completion" is stored in a parameter table in the microcomputer 36. Thus, the routine is ended. However, if NO in step 401, the flow advances to step 403 wherein data indicating "line printing is continued" is stored in the parameter table, and the routine is ended.

In the procedures shown in FIG. 19B, the microcomputer 36 reads its parameter table in step 501. The microcomputer 36 then checks in step 502 whether or not line printing is completed. If NO in step 502, line printing is continued. However, if YES in step 502, the next line printing is started. Therefore, these procedures allow printing of the nth line as in FIG. 17 or 18.

According to this embodiment, the printing section 20 includes the printing head heater 26, the roller 27, the IC 30 having the control circuit, and so on and the operator holds the printing section to perform scanning on the paper sheet 40. In this case, the microcomputer 36 in the control circuit changes the drive timings of the heater 26 to print a normal shaped letter so as to correspond to a change in the velocity of the printing section 20. At the same time, when the microcomputer 36 detects the control codes "CL" and "LF" among the printing data transmitted from the main unit, line printing is interrupted even if the printing section 20 is continuously fed. When the microcomputer 36 detects that the printing section 20 stops and is then started again, the microcomputer 36 detects that the printing section 20 is located at the start position of the next line, and causes the printing section 20 to start printing for the corresponding line. Therefore, the horizontal scanning mechanism of the printing head and the line feed mechanism of the paper sheet can be eliminated. In particular, the scanning distance of the printing section 20 can be increased without increasing the sizes of the horizontal scanning mechanism and the line feed mechanism. At the same time, the start positions of the respective lines can be aligned by the printing section. As a result, printing can be economically performed on a large paper sheet. In addition, since the horizontal scanning mechanism and the line feed mechanism are eliminated, power consumption can be decreased. Furthermore, noise can be substantially eliminated.

In the embodiment described above, the letter is printed in units of dots. The present invention can also be applied to image printing such as figure printing. In addition, in the above embodiment, the operator directly holds the printing section 20 and moves it to perform printing. However, the printing section 20 may be indirectly moved to obtain the same effect as in the above embodiment. Alternatively, a line feed may be performed such that the paper sheet is fed by a drive mechanism such as a pulse motor, while the operator moves the printing section only along the horizontal direction. The present invention can also be applied to a thermal transfer printing head to obtain the same effect as in the above embodiment. In addition, the control codes "CR" and "LF" are used in this embodiment. However, the control codes excluding printing data can be inserted at an end of each line. Therefore, the control codes are not limited to the above-mentioned codes.

In this embodiment, the printing section has the printing head, the speed detector, and the control circuit, and the operator manually moves the printing section to perform scanning on the paper sheet. In this case, the microcomputer in the control circuit changes the drive timings of the printing head in accordance with a change in velocity of the printing section. At the same time, when the microcomputer detects the control codes "CR" and "LF" from the printing data supplied from the main unit, the printing section continues to move although it does not perform printing any more on the corresponding line. In addition, the speed detector detects the zero velocity of the printing section, and the microcomputer detects that the printing section is moved to the beginning of the next line. Thereafter, next line printing is perforemd. As a result, the size of component parts and apparatus as a whole will not be increased. It is suitable for performing printing on a large paper sheet at a low cost. In addition, the printing start positions of the respective lines can be aligned.

What is claimed is:

1. A printing apparatus connected to a data processing device for printing data supplied from the data processing device, said apparatus comprising:
   printing head means for performing printing on a paper sheet;

printing head driving means for driving said printing head means;

velocity detecting means for detecting a velocity of said printing head means; and controlling means for controlling a drive pulse width and a drive timing of said printing head driving means such that the drive timing of said printing head means changes in correspondence with a velocity of said printing head means when said printing head means is manually moved to perform scanning on the paper sheet, and a signal indicating the velocity of said printing head means is supplied from said velocity detecting means to said controlling means, said controlling means controlling said printing head driving means to start printing on the sheet when the detected velocity of said printing head means is not zero for a predetermined time after starting detecting for the velocity of said printing head means.

2. An apparatus according to claim 1, wherein said controlling means controls said printing head driving means to start printing for a next line on the sheet when a value of the velocity of said printing head means is not zero at a predetermined time after starting detecting for the velocity of said printing head means on the sheet.

* * * * *

UNITED STATES PATENT AND TRADEMARK OFFICE
CERTIFICATE OF CORRECTION

PATENT NO. : 4,933,867
DATED : June 12, 1990
INVENTOR(S) : ISHIGAKI, Toshinori

It is certified that error appears in the above-identified patent and that said Letters Patent is hereby corrected as shown below:

ON THE TITLE PAGE:

On the title page, under number [30] the priority document listed as number four (4) reads:

"May 31, 1985 [JP] Japan ......... 58-94815"

The fourth (4th) priority document should read:

--May 31, 1983 [JP] Japan ........ 58-94815--

Signed and Sealed this

Twenty-seventh Day of August, 1991

Attest:

HARRY F. MANBECK, JR.

Attesting Officer

Commissioner of Patents and Trademarks